United States Patent [19]

Hickey et al.

[11] 3,964,887

[45] June 22, 1976

[54] RADIOACTIVE GAS STANDBY TREATMENT APPARATUS WITH HIGH EFFICIENCY RECHARGEABLE CHARCOAL FILTER

[75] Inventors: Thomas Nelson Hickey; Ivars Sigurds Spulgis, both of Columbus, Ohio

[73] Assignee: CVI Corporation, Columbus, Ohio

[22] Filed: Mar. 31, 1975

[21] Appl. No.: 563,768

Related U.S. Application Data

[62] Division of Ser. No. 317,434, Dec. 21, 1972.

[52] U.S. Cl. ................................. 55/267; 55/210; 55/316; 55/485
[51] Int. Cl.[2] ........................................ B01D 50/00
[58] Field of Search ............... 55/18, 210, 212, 316, 55/259, 267, 269, 312, 316, 387, 485

[56] References Cited
UNITED STATES PATENTS

| 3,172,747 | 3/1965 | Nodolf | 55/387 |
| 3,218,997 | 11/1965 | Berghout | 55/DIG. 9 |
| 3,299,620 | 1/1967 | Hollingworth | 55/387 |

OTHER PUBLICATIONS

Cambridge CBR Filters, Cambridge Filter Corp., Bulletin, 109 B, dtd. 1962, Syracuse, N.Y. pp. 1–5.

*Primary Examiner*—Bernard Nozick
*Attorney, Agent, or Firm*—Charles N. Quinn

[57] ABSTRACT

Standby gas treatment system for removal of radioactive release from a nuclear containment structure not only during normal purge operations but also in the event of a design basis accident. Ventiduct trains arranged in parallel so that one is redundant are each operative to extract dust in excess of 0.3 microns and adsorb radioactive iodine and compounds thereof at 99.9% plus efficiency. A rechargeable gasketless charcoal filter in each train can be filled or emptied without removing the filter enclosures per se. Laminar flow filter beds entirely encapsulate the gas stream to provide low gas velocity and even distribution across the charcoal cage without channeling, thereby securing long residence time.

2 Claims, 9 Drawing Figures

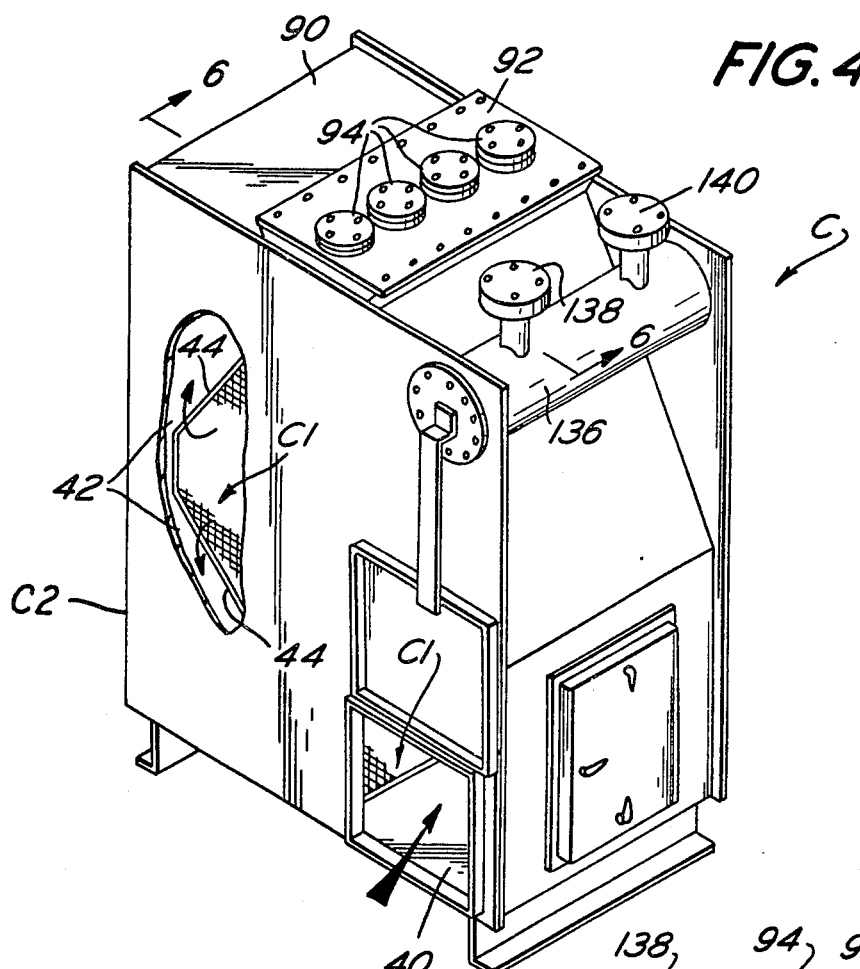
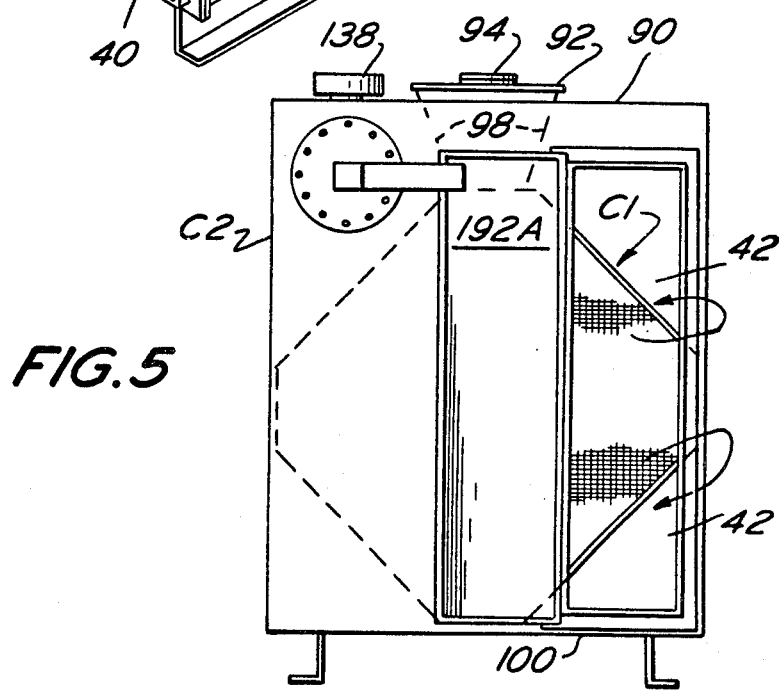

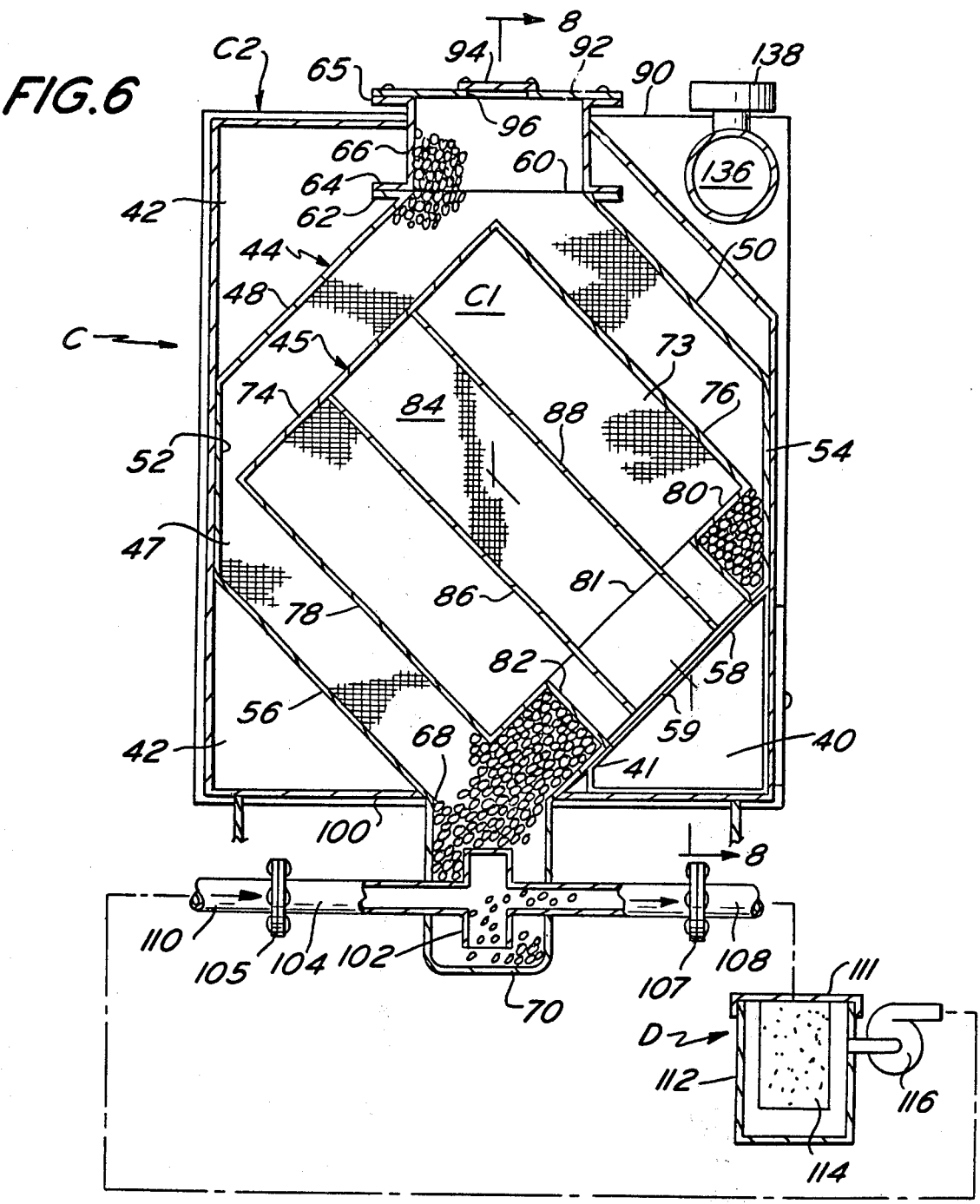
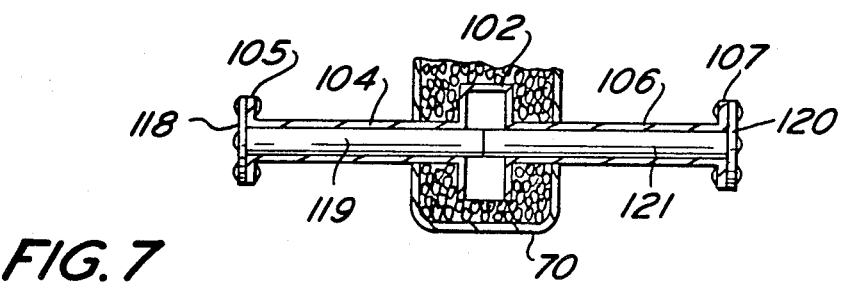
FIG. 6
FIG. 7

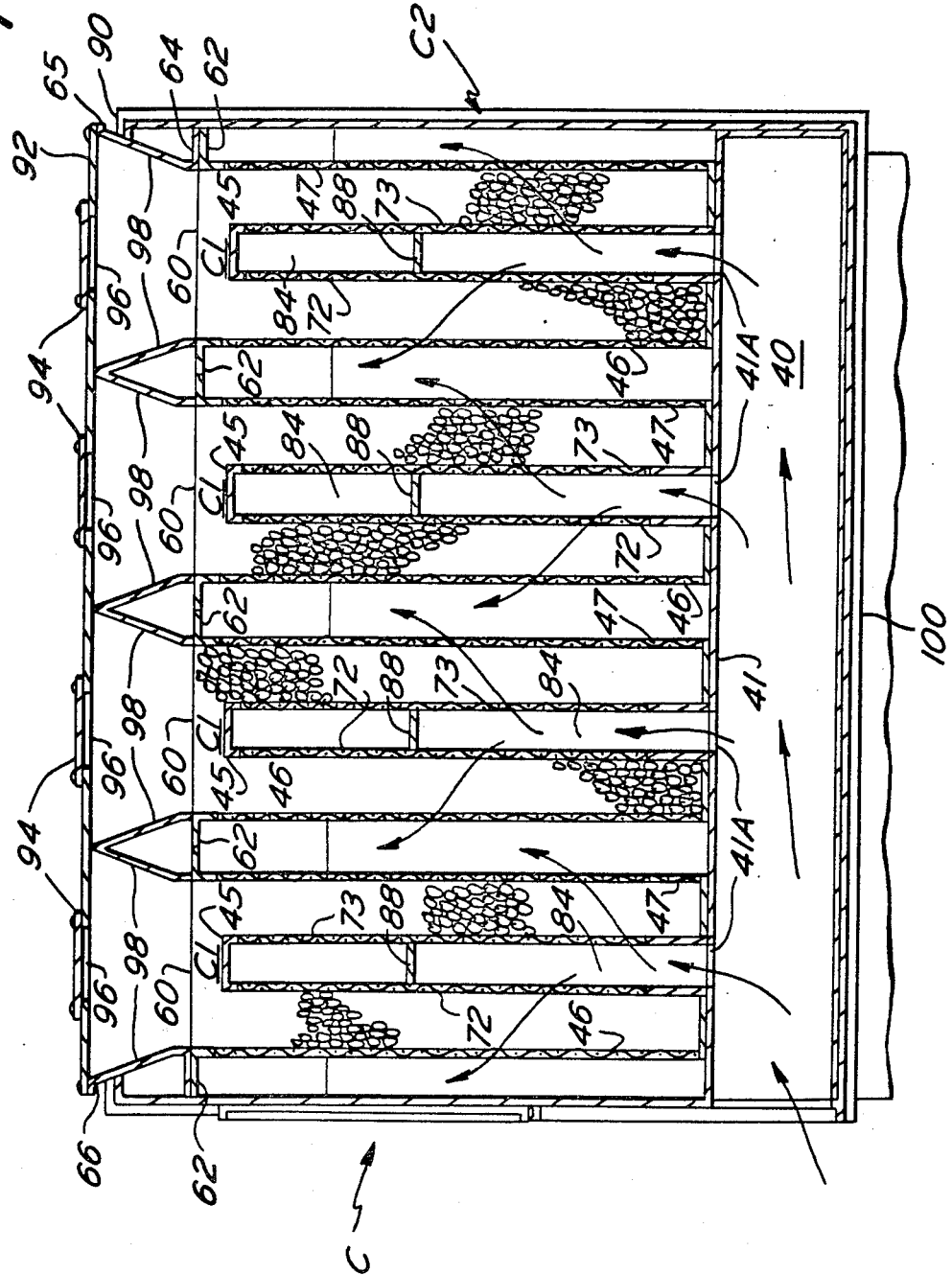

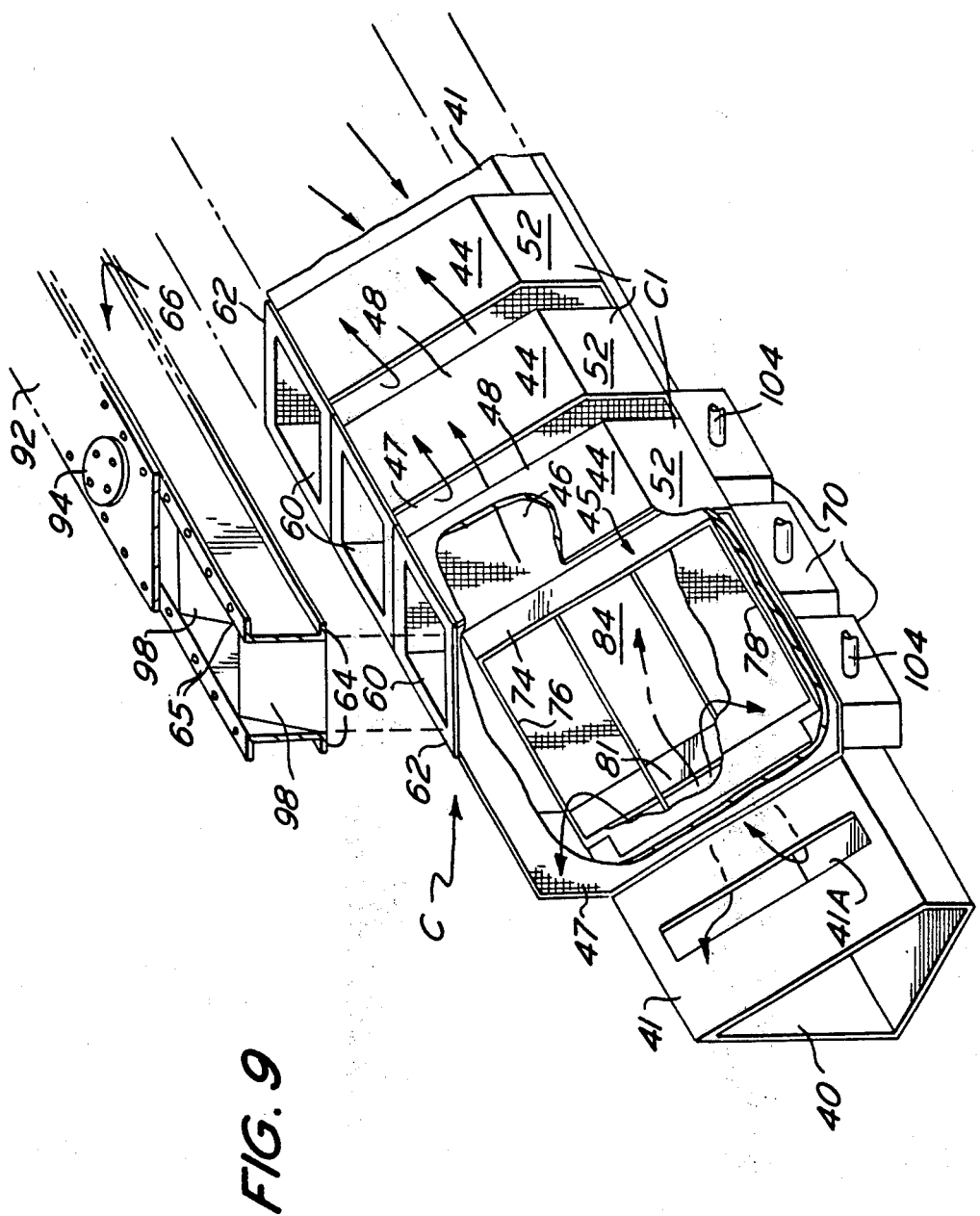

RADIOACTIVE GAS STANDBY TREATMENT APPARATUS WITH HIGH EFFICIENCY RECHARGEABLE CHARCOAL FILTER

This is a division of application Ser. No. 317,434, filed Dec. 21. 1972.

This invention relates to a standby gas treatment system and high efficiency charcoal filter for removal of radioactive release within a nuclear containment structure not only during normal purge operations but also in the event of a nuclear failure. More particularly, this invention relates to a rechargeable gasketless charcoal filter which can adsorb radioactive constituents, especially iodine and methyl iodide, at an efficiency of better than 99.9% even should a design basis or loss of coolant accident occur.

With the rapid development of nuclear power generation, it has become necessary from an ecological standpoint to establish stringent safety requirements regarding the discharge of any radioactive contamination into the ambient atmosphere. Not only must absolute precautions be taken to prevent the release of such containments into the atmosphere during normal operation of the nuclear reactor, but also emergency back-up systems must be provided to handle design basis accidents, as for example loss of coolant failures, within the nuclear powerplant. Thus, under any conditions there must be absolute non-negotiable assurance that the level of containment discharge into the atmosphere approach zero.

It is therefore an object of this invention to provide a standby gas treatment system for purging the secondary containment structure of a nuclear power generator in the event of a design basis or loss of coolant accident.

Another object of this invention is to provide a high efficiency charcoal filter for such standby gas treatment systems which will adsorb radioactive iodine and methyl iodide at 99.9% plus efficiency should a design basis failure occur in the nuclear reactor.

Still another object of this invention is to provide a rechargeable high efficiency filter which is gasketless in design and capable of selectively adsorbing a wide variety of radioactive isotopes from a gas stream.

Yet another object of this invention is to provide a rechargeable gasketless charcoal filter which can be filled or emptied without removal of the charcoal bed enclosure.

Yet still another object of this invention is to provide a high efficiency charcoal filter which will assure uniform gas flow distribution at low velocity without any bypass or channeling.

A further object of this invention is to provide a high efficiency charcoal filter in which the entire gas stream passing through the filter is submerged in a cage of charcoal.

Yet a further object of this invention is to provide a standby gas treatment system and high efficiency charcoal filter whose construction will withstand external or internal pressure, vibrational forces, seismic loads and all anticipated temperature conditions.

Still a further object of this invention is to provide a standby gas treatment system with instrumentation and interlocks provided to alert the operator should off-design conditions occur in the treatment system itself.

Yet still another object of this invention is to provide a standby gas treatment system which is safeguarded against overtemperatures.

Additional objects of this invention is to provide a gasketless rechargeable high efficiency filter which affords ease-in-place charcoal sampling and ease-in-place testing of the standby gas treatment system by fluorocarbon refrigerant and dioctylphthalate vapor injection procedures.

Other objects of this invention are to provide an improved device of the character described which is easily and economically produced, sturdy in construction, and highly efficient and effective in operation.

In essence, our new and improved standby gas treatment system comprises a pair of ventiduct trains arranged in parallel so that one is redundant or auxiliary while the other is adapted to be placed in communication with the containment housing in the event of a nuclear failure or incident. One train unit is manually or automatically placed into operation while the back-up parallel train is actuated should the first ventiduct train incur a failure infunction. Following a predetermined time interval after being made operative by means of appropriate switches, valves and dampers, the radioactive gas and dust in the containment housing is drawn through the activated train and after filtration and adsorption, the purified and cleansed air is released through a stack exiting to atmosphere. A moisture separator or demister collects free water in the containment effluent for discharge into a radioactive waste sump. The remaining humid air passes across an electric heater which increases the temperature of the stream and reduces the relative humidity thereof to at least 70 percent RH. Next the air passes through a pre-filter section which entraps any coarse particles breaking through the demister. The pre-cleaned airstream then passes through a high efficiency particulate filter for removal of particles above 0.3 microns in size. A high efficiency charcoal adsorper then receives the dehumidified and filtered gas stream which contains the isotope inventory of elemental iodine and methyl iodide together with some moisture. The adsorption of these radioactive elements takes place during residence of the gas as it passes through the charcoal beds. The charcoal adsorber is of rechargeable gasketless design and contains a plurality of vertically oriented horizontally spaced parallel beds. Each bed includes a central channel in communication at one end with a inlet plenum and terminating in a blind wall or barrier at the other end such that each channel is submerged and entirely encapsulated within a charcoal cage. By virtue of the blind nature of the charcoal bed channels, the gas stream is squeezed laterally under essentially laminar flow conditions through a cage of charcoal held within perforate walls on each side of the corresponding bed channel. The direction of flow is substantially normal to the walls of said charcoal cage for emergence within the spaces separating adjacent beds. An exit plenum coupled to each of the area spaces between the beds then directs the gas stream prior to atmospheric discharge through a downstream high efficiency particulate filter for removal of any charcoal fines entrained during passage through the charcoal adsorber.

Each charcoal bed is an independent unit which is filled through a hopper port at the top and by suction eductor port at the bottom. The geometry of each bed is such that the angles of the foraminous caging walls are all greater than the angle of repose of the charcoal particulate, thereby eliminating any voids through which bypass of the gas stream might occur.

With the above and related objects in view, this invention consists of the details of construction and combination of parts as will be more fully understood from the following detailed description when read in conjunction with the accompanying drawings in which:

FIG. 4 is a front perspective view of the high efficiency charcoal filter section.

FIG. 5 is a rear elevational view of the high efficiency filter section.

FIG. 6 is a sectional view taken along lines 6-6 of FIG. 4 and schematically illustrating an integral suction mechanism for withdrawing spent charcoal from the filter elements.

FIG. 7 is a sectional view of the charcoal removal mechanism in closed disposition.

FIG. 8 is a sectional view taken along lines 8-8 of FIG. 6.

FIG. 9 is a partly exploded and partly fragmentary perspective view of the high efficiency charcoal filter section.

Figure 3:
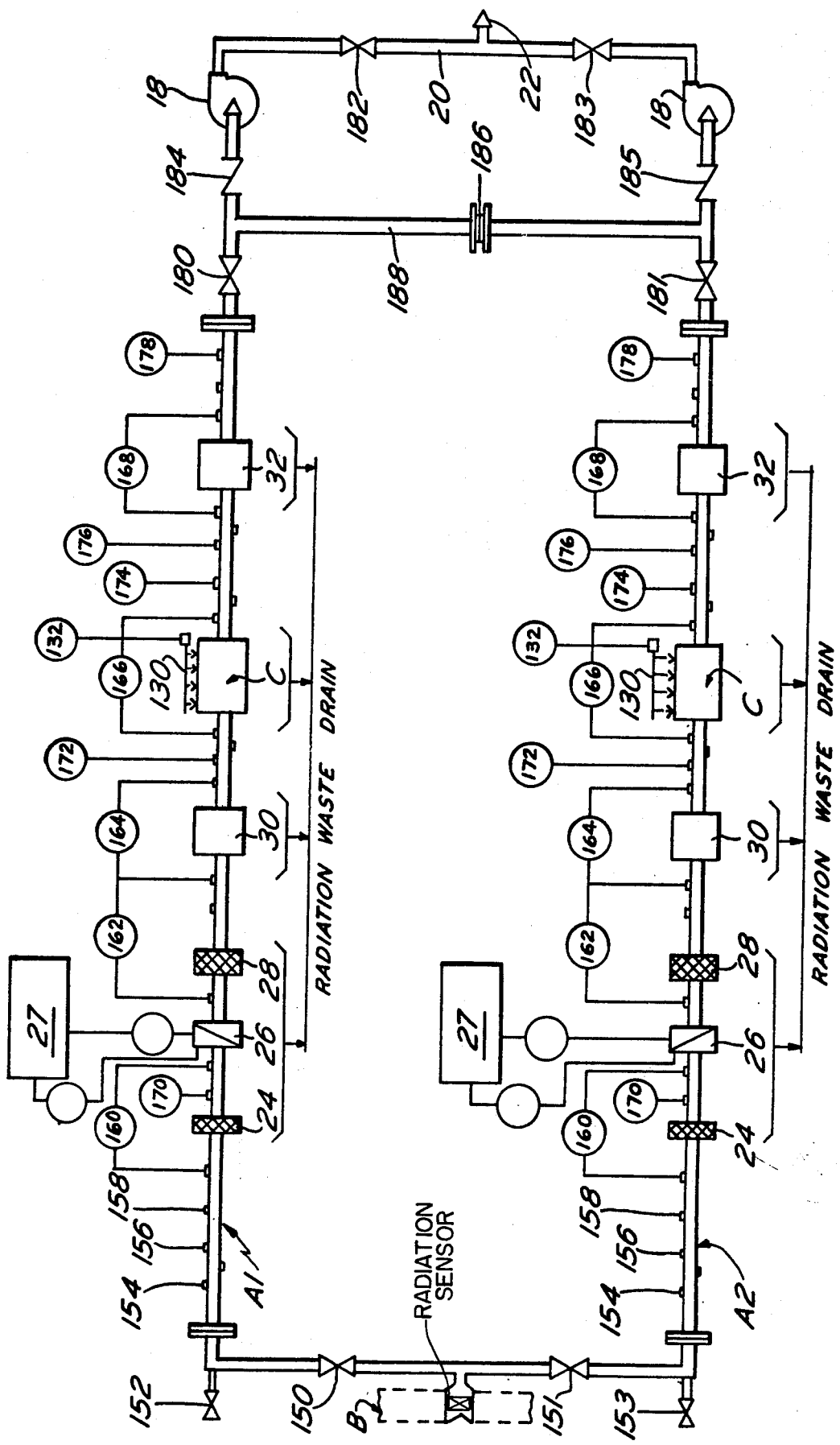
FIG. 3 is a schematic flow diagram of the standby gas treatment system illustrating a high efficiency charcoal adsorber embodied in this invention.

Referring now in greater detail to the drawings in which similar reference characters refer to similar parts, we show in FIG. 3 a standby gas treatment system comprising a pair of identical ventiduct trains A1 and A2 which are arranged in parallel and adapted by way of a valved manifold 12 to be placed in communication with the interior of the secondary containment housing B for the nuclear power generator in the event of a design basis or loss of coolant accident. Automatic valves 150 and 151 direct the radioactive gases into one or the other of the ventiduct trains A1 or A2, each being designed to handle the entire gas flow and radioactive isotope inventory. Following a predetermined time interval after the occurrence of the failure, one of the trains is placed in operation. A blower 18 in the operative ventiduct train draws the contaminated gases through a series of filters and adsorpers for removal of the radioactive contaminants and then discharges the purified gases by way of valved exhaust manifold 20 and stack 22 to atmosphere.

Each ventiduct train includes in the order of the air or gas path flow a demister and roughing filter 24, an electric heater 26, a prefilter 28, an upstream high efficiency particulate filter 30, a high efficiency charcoal adsorber C, and a downstream high efficiency particulate filter 32.

The demister and roughing filter 24 which is not detailed in the drawings consists of a series of 24 × 24 × 2 inches thick demister pads having an antecedent ¼ inch stainless steel mesh entrainment separator to prevent blinding. The entrainment separator acts to remove free water impinging upon the front face of the demister section. For fine mist agglomeration, the entrainment is followed by a nominal 2 inch pad consisting of alternately woven stainless steel wire and glass fiber mesh. The stainless steel wire knit serves to drain the entrained moisture so that the agglomerated droplets do not progress along the glass fiber to a breakthrough condition at the rear face of the demister. The purpose of the demister is to eliminate direct water spray, free droplets of water and any mist which may be entrained in the incoming gas stream to the standby gas treatment system. The free water is collected into drip trays and conducted by gravity flow through drain pipes leading to a radioactive waste sump. The gas, after passing through the demister 24 contains no free water, but only air at a maximum 100 percent relative humidity. Each demister unit is designed to accommodate 1000 cfm air flow without exceeding 5 percent increase in pressure drop when operated 260° F with a stream-air mixture containing 1 gallon of water droplets.

The electric heater 26 is utilized to reduce the relative humidity of the inlet air from 100 percent to less than 70 percent in order to enhance the adsorption efficiency of the subsequently positioned charcoal filter C whereby the latter may operate to its rated 99.9% plus adsorption efficiency for radioactive iodine and methyl iodide. In general, the heater 26 comprises a standard, extended fin, stainless steel air heater, which is so configured to cause the entire air flow in the particular ventiduct train to pass across the heater elements. Two electric heaters elements are included for each of three phases. The power is controlled by a zero phase controller 27 in order to achieve fine adjustment. Provisions are made for power adjustment from high (4000cfm) to low (1000cfm) air flow conditions by switching each of the two heater elements per phase from parallel to series connection. A proportional output temperature controller milliampere signal regulates the zero phase power controller output to match the heater output to the required air flow temperature rise for superheating the air below 70 percent relative humidity.

The pre-filtered section 28 located downstream of the electric heater 26 consists of a rack structure supporting four 24 × 24 × 21 inches deep pre-filter pockets. The efficiency of the pre-filter 28 is 90 to 95% NBS Atmospheric Stain (dust spot) average. The dust holding capacity is a minimum of 4 lb. NBS standard test dust without exceeding 1.0 inch of water when operated at rated air flow capacity. The pre-filters withstand an air flow which will produce a pressure drop thereacross of 5.0 inches of water for a minimum of fifteen minutes without visible damage or loss of efficiency. In clean condition, the pre-filter effects a pressure drop no greater than 0.45 inch of water.

The high efficiency particulate filters 30 and 32 filter the air flow upstream and downstream of the charcoal adsorber C. The upstream filter 30 is utilized to adsorb any particulate dust which may enter the standby gas treatment system A1 or A2 from the containment building B. The downstream high efficiency particulate filter 32 prevents any charcoal fines carried from the charcoal adsorber C from exiting through the stack 22. Both of the high efficiency particulate filters 30 and 32 are preferably absolute filters, model 1E-1000-1, made by the Cambridge Filter Corporation, of Cambridge, Massachusetts, and generally comprise glass-asbestos fire resistant cloth having aluminum separators with cadmium plated steel frames. The air flow resistance is 1.0 inch of water maximum when operated at rated flow capacity.

The high efficiency charcoal adsorber section C is a most important part of the ventiduct train and the construction of the adsorber unit constitutes a significant portion of the instant invention. In particular, the charcoal beds are so arranged that a uniform flow of containment air passes through each of the bed face areas and the bed thickness is such that will provide sufficient residence time at maximum air velocities to assure removal of the radioactive iodine and methyl iodide containments.

As is best shown in FIGS. 4, 5, 6, 8 and 9, the adsorber unit C comprises a plurality of horizontally spaced parallel beds C1 mounted within another shell or housing C2. Each of the beds support the charcoal within a perforate jacket consisting of a pair of spaced screen facings on each side of a central blind passageway so that the encapsulated charcoal defines a cage about the passageway channel. The charcoal beds C1 are arranged in parallel, each sharing a common inlet duct or plenum 40. The gas enters the beds C1 after passing through the upstream filter 30 and is directed through a charcoal cage in laminar flow disposition for release into the passages spaced between adjacent beds. The filtered air is then ducted out of the spaced passages into an outlet plenum 42 defined by the outer housing C2 for transmission to the downstream particulate filter 32 and subsequent venting to atmosphere.

The manner of construction of the charcoal beds C1 is best illustrated in FIGS. 6, 8 and 9. Each bed C1 has an outer shell 44 of generally octagonal peripheral configuration and an inner shell 45 of substantially rectangular peripheral configuration. The outer shell 44 includes a pair of opposed perforate faces 46 and 47 whose perimeter is girded by a sheet metal frame having walls 48, 50, 52, 54, 56 and 58. A rectangular opening 60 at the top of the frame is flanged at 62 for attachment to the lower constitutionally extending webs 64 of fill hopper 66. The bottom of each bed C1 includes an open rectangular throat 68 which empties into a well 70.

The interior shell 45 comprises a pair of interior perforate retaining faces 72 and 73 which are spaced intermediate the outer perforate faces 46 and 47. The peripheral rectangular frame of the inner shells 45 is disposed at a 45° angle from horizontal and includes confining walls 74, 76, 78 and 80 which are symmetrically spaced from the respective girding walls 48, 50, 56 and 58 of the outer frame. A rectangular opening 81 formed in the diagonal wall 80 is in registration with a corresponding rectangular opening 59. A rectangular collar 82 interconnects the openings 59 and 81 to define an entranceway from the plenum 40 into a central channel 84 which is blind within each bed C1 except for the perforate lateral faces 72 and 73 retaining the charcoal.

Each of the beds C1 is secured to the upper inclined surface 41 of the inlet plenum 40 by superimposing entranceway 82 over complementary aperture 41A and then peripherally welding the end wall 58 thereabout. Stiffening ribs 86 and 88 provide interjacent support for the inner perforate faces 72 and 73 against the load of charcoal within the jacket. The upper portion of each bed C1 is secured to the fill hopper 66 by welding the flanges 62 to the webs 64. The fill hopper 66 constitutes a longitudinally extending open trough which is inserted within a window running along the roof 90 of housing C2 and then welded thereto. A cover plate 92 is detachably secured to the fill hopper 66 by bolting the cover plate upon the upper webs 65. Auxiliary caps 94 are bolted about fill ports 96 in the cover plate 92 sets of downwardly convergent funnel plates 98 are secured within the trough 66 below the fill ports 96 and direct the charcoal into the respective beds.

As is apparent from the foregoing, the charcoal beds completely submerge and surround the interior blind passageway 84 with a cage of charcoal contained between the inner screens 72, 73 and the outer screens 46, 47. This concept provides a completely restrained cage of charcoal through which all gas must pass. This cage covers all weld areas and joints so that no leakage path is possible between the inlet and outlet sides of the adsorber C other than that through at least 6 inches of charcoal. The charcoal cage containment screens are preferably of perforated stainless steel having for example 0.049 inch diameter holds and 37.7% free area. For a design flow rate of 4000 cfm, the face velocity of air entering and leaving the caged charcoal bed is 40 ft per minute. The effective weight of charcoal which is directly exposed to air flow is such that the charcoal filter is capable of adsorbing 5550 grams of radioactive iodine and methyl iodide.

It is to be especially noted that all basic constructional angles of the charcoal containment are 45° or greater and thus always in excess of the angle of repose of the granular activated charcoal employed, i.e., approximately 30° in the instance of 8 × 16 mesh. In this manner, any possibility of creating voids is entirely eliminated during filling of the jacket, thereby assuring that bed will be charged uniformly without any bypass channels through which the gas can travel in passing through the bed.

Since all charcoal to bed interface angles are substantially greater than the charcoal angle of repose, settling, vibration shock loads, seismic loads and the like, cannot alter or diminish the charcoal cage thickness.

For the purpose of draining the charcoal from the beds C1, a suction system is employed, as is best illustrated in FIGS. 6 and 7. The wells 70 which are suspended in fully closed disposition from each of the beds under the floor 100 of the housing C2 contain inverted cups 102. Oppositely disposed pipes 104 and 106 communicate with the interior of each cup 102 and extend through the walls of the well 70. A closed loop suction or eductor D is adapted to be coupled by way of hoses 108 and 110 to the flanges 105 and 107. The eductor includes a tank 112 having a bag 114 suspended below the lid 111 thereof. A pneumatic conveyor turbine 116 operating at high velocity effects aspiration up through the bottom of the cup 102 of all charcoal depositing within the well 70 until the particular bed hooked up to the eductor D is exhausted. When the beds C1 are inoperative disposition for filtering contaminated gas, the cup 102 and the pipes 104 and 106 are plugged. A cap 118 having a plug 119 is secured to the flange 105 such that the plug 119 fills the pipe 104 and extends into the cup 102. Similarly, a cap 120 having a plug 121 is secured upon flange 107 which the plug 121 fills pipe 106. Charcoal loading and unloading is performed only at times when a charcoal change is required, as when the charcoal is spent as a consequence of contamination resulting from a design basis accident or when it has experienced long term aging, for example three years of standby conditions.

A water deluge system is incorporated within the charcoal adsorber housing C2 to deliver water directly upon the charcoal beds should an off-design overheat temperature condition exist. A series of internal nozzles 130 automatically activated by a temperature sensor 132 in the event the sensor 132 reads above 310°F, a temperature well below the charcoal ignition point. The water, which is intended to act as a coolant for the charcoal rather than a fire extinguishing device, immerses the granules by gravitating downwardly and through capillary action permeates the bed to provide the required cooling. Excess water seeps through the perforated plates defining the charcoal cage and then passes on through the bottom drain to the radiation — waste sump.

A permanently installed bypass duct 136 is provided to circumvent the charcoal when it is desired to test the efficiency of the particulate filters 30 and 32 during dioctylphthalate (DOP) smoke testing. Suitable internal hatches (not shown) are closed within the adsorber housing when the DOP testing is performed. Atmospheric venting valves 138 and 140 automatically vent the bypass duct 136 to atmosphere whenever the charcoal beds C1 are returned to operating condition.

Referring now to FIG. 3, suitable air control valves 150 and 151 are included in the manifold 12 for directing the gas flow from the containment B into one or the other of the ventiducts A1 or A2. Auxiliary bleed valves 152 and 153 at the entrances of the respective ventiduct trains allows cooling air to be drawn through the corresponding train in the event of overheating of the various filter elements or merely to draw air through either system to test the components thereof. Instrumentation ports 154, 156 and 158 in the inlet zone of each system permit convenient monitoring of flow rate, temperature, pressure and the like. Differential pressure indicators 162, 164, 166 and 168 enables the operator to gauge the pressure drop operating characteristics across the various filter elements. Additional indicating, recording and control instrumentation along the ventiduct trains are designated by the reference numerals 170, 172, 174, 176 and 178. Exit valves 180 and 181 are utilized to control the exhausting of the purified gas from the respective trains A1 or B1 while stack valves 182 and 183 function to release the gas to atmosphere through stack 22. Suitable check valves 184 and 185 prevent back-up of the ambient atmosphere through the system in view of the fact that the containment structure as well as the ventiduct trains themselves operate at a slight negative pressure. A restriction orifice 186 in crossbleed line 188 couples both the ventiducts A1 and A2 for equivalent pressure conditions.

Figure 1:
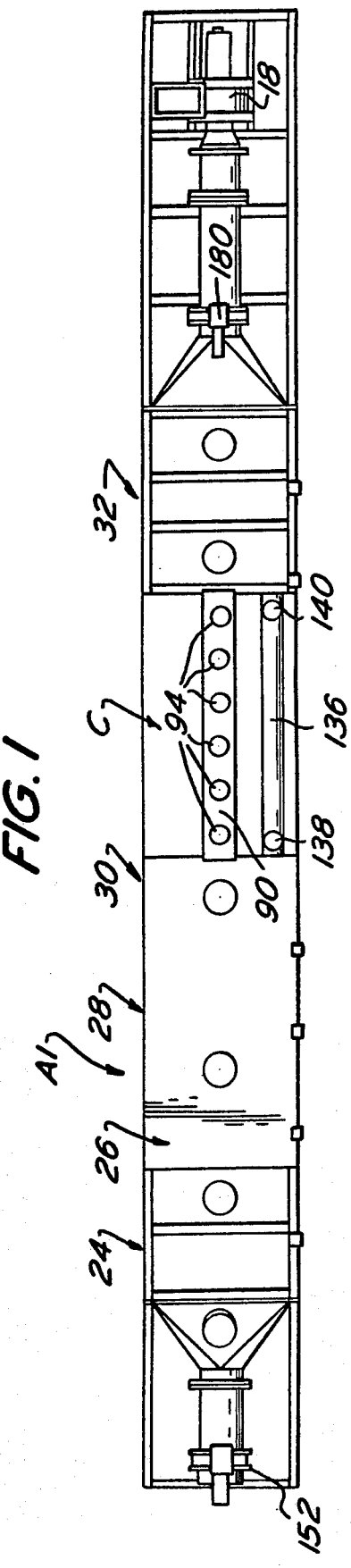
FIG. 1 is a top plan view of our new and improved standby gas treatment system for dissipation of radioactive discharge within a nuclear power station containment in the event of a design basis or loss of coolant accident.
Figure 2:
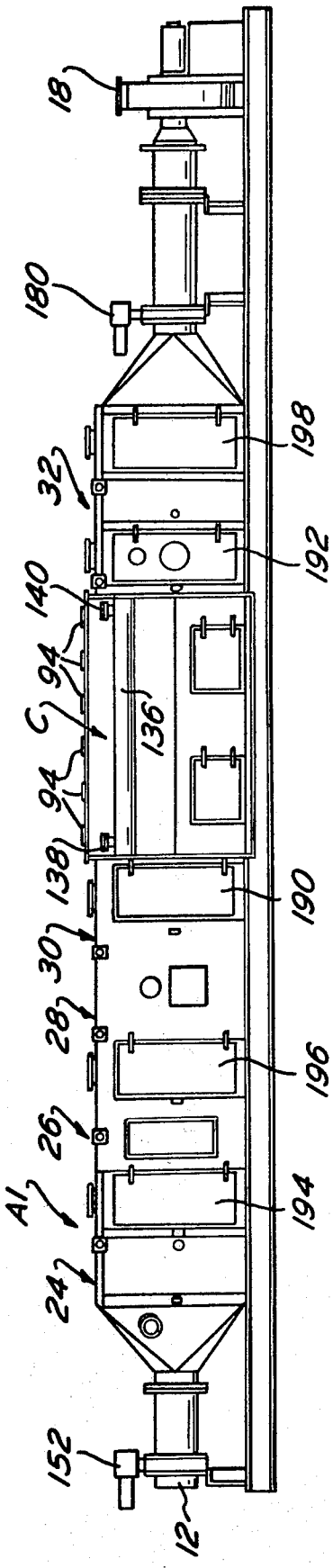
FIG. 2 is a side elevational view thereof.

Referring to FIG. 2 it may be seen that suitable hatches and doors are provided to permit access to the filter and adsorber elements. Sealed doors 190 and 192 permit inspection of the charcoal filter beds C1; hatch door 194 allows inspection of the demister 24, hatch 196 for the prefilter 28, and access door 198 and for the upstream and downstream particulate filters 30. All hatches, access doors and vents are interlocked to prevent activation of the system if personnel are inside either ventiduct.

Although this invention has been described in considerable detail such description is intended as being illustrative rather than limiting since the invention may be variously embodied without departing from the spirit thereof, and the scope of the invention is to be determined as claimed.

What is claimed is:

1. A standby gas treatment system for removal of radioactive contamination from the containment housing of a nuclear reactor in the event of a design basis or loss of coolant accident comprising:
    at least one ventiduct train adapted to be coupled to the interior of the containment housing in the event of a nuclear incident,
    means constituting a sensor for placing one ventiduct train in operative disposition and drawing a stream of gas therethrough when the level of radioactivity in the containment housing reaches a predetermined level,
    demister means for removing free water droplets entrained in the incoming gas stream,
    means for reducing the relative humidity of the stream of gas exiting from said demister means,
    means for filtering particulate dust in excess of 0.3 microns size in the gas stream,
    a charcoal adsorber in the downstream side of said means for filtering, said charcoal adsorber being so constructed and arranged as to develop a static head thereacross and squeeze the gas therethrough in laminar flow disposition,
    means constituting a higher efficiency particulate filter for removal of charcoal fines entrained in the gas stream upon passing through the adsorber, and
    means for discharging the purified gas stream from the ventiduct to atmosphere.

2. The system of claim 1 wherein said charcoal adsorber includes a plurality of beds in which the gas entering each of said beds is submerged in a charcoal cage.

* * * * *